United States Patent [19]
Lüdeke et al.

[11] 4,235,107
[45] Nov. 25, 1980

[54] METHOD AND ARRANGEMENT FOR MEASURING THE PHYSICAL TEMPERATURE OF AN OBJECT BY MEANS OF MICROWAVES

[75] Inventors: Kai M. Lüdeke, Hamburg; Burkhard Schiek; Jürgen Köhler, both of Halstenbek, all of Fed. Rep. of Germany

[73] Assignee: U.S. Philips Corporation, New York, N.Y.

[21] Appl. No.: 6,062

[22] Filed: Jan. 24, 1979

[30] Foreign Application Priority Data

Jan. 27, 1978 [DE] Fed. Rep. of Germany ....... 2803480

[51] Int. Cl.³ .............................................. G01J 5/52
[52] U.S. Cl. .............................................. 73/355 EM
[58] Field of Search ............... 73/355 EM, 355 R; 343/100 ME, 5 PN; 324/451

[56] References Cited

U.S. PATENT DOCUMENTS

| 3,376,748 | 4/1968 | Glomb | 73/355 EM |
| 3,492,869 | 2/1970 | Toyota et al. | 73/355 EM |
| 3,638,494 | 2/1972 | Broussard et al. | 73/355 R |

OTHER PUBLICATIONS

"An Automatic Emissivity Compensated Radiation Pyrometer", by Kelsall from Journal of Scientific Instruments, vol. 40, pp. 1-4, 1-1963.

*Primary Examiner*—James J. Gill
*Attorney, Agent, or Firm*—Thomas A. Briody; Robert T. Mayer; Jack E. Haken

[57] ABSTRACT

A method for measuring the physical temperature of objects by means of microwaves using a Dicke radiometer. A noise signal is continuously applied to an antenna which is directed towards the object and is periodically and alternately applied, together with the antenna signal, which includes reflected noise and object emission to the radiometer. The integrated output signal of the radiometer controls the noise power and is proportional to the object temperature.

15 Claims, 12 Drawing Figures

METHOD AND ARRANGEMENT FOR MEASURING THE PHYSICAL TEMPERATURE OF AN OBJECT BY MEANS OF MICROWAVES

The invention relates to a method for measuring the physical temperature of objects by means of microwaves, using a Dicke radiometer, as well as to an arrangement for performing the method.

From astrophysics and geophysics it is known to measure the radiation temperature $T_S$ of stars or terrestial objects in the frequency range of the microwaves.

The radiometer used for this purpose (Dicke radiometer and derived method in R. H. Dicke "The Measurement of Thermal Radiation at Microwave Frequencies", Rev. Sci. Instrum., Vol. 17, pages 268–275, July 1946: and "Microwave Radiometry", Manual of Remote Sensing, American Society of Photogrammetry, Falls Church, Va., 1975, Part I, Chapter 9, pages 499–527) receives a thermal microwave power radiated by the object which, in accordance with the Nyquist formula is directly proportional to the radiation temperature $T_S$. The radiation temperature $T_S$ is the product of the emissivity E and the object temperature $T_O$.

$$T_S = E \cdot T_O \tag{1}$$

Of late this temperature measuring method has also been used in technical and medical fields. The object of the measurement was, as a rule, the physical object temperature $T_O$ rather than the radiation temperature $T_S$. An accurate determination of the object temperature $T_O$ by means of conventional radiometers is impossible when (a) the emissivity of the object is not accurately known or
(b) the emissivity of the object changes in an unknown manner during the measuring procedure or
(c) the emissivity changes in an unknown manner between the measurements made on individual objects from a group of objects.

This problem will be further explained with reference to an example.

Figure 1A:
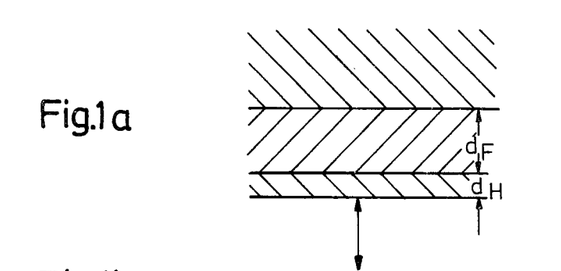
FIGS. 1-4 show the prior art.
Figure 1B:
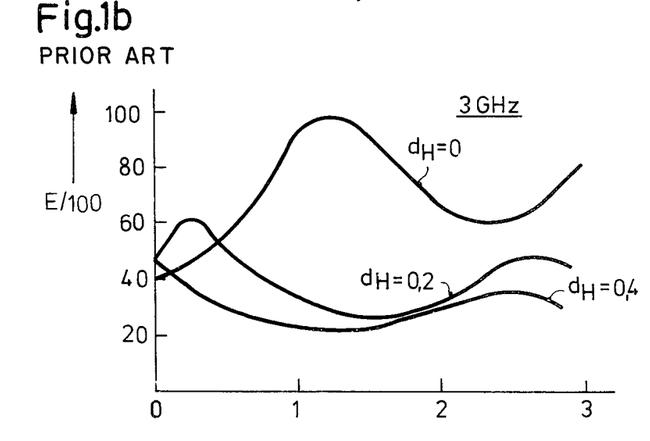
Figure 1C:
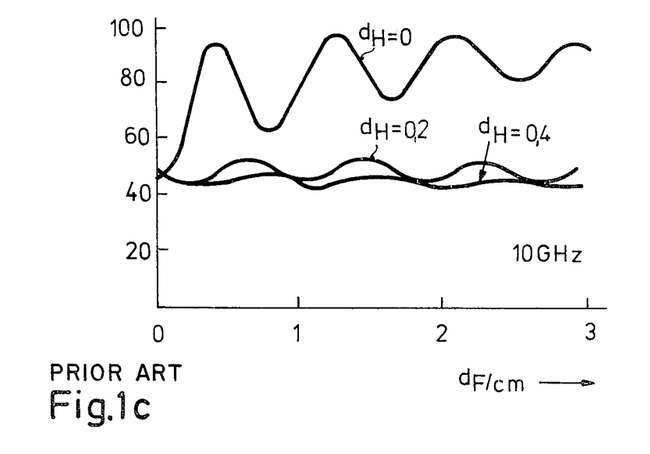

FIGS. 1b and 1c show the emissitivity of a triple-layer model of the surface of the human body at 3 GHz and 10 GHz as a function of the thickness of the skin and fat layers. FIG. 1a (H. P. Schwan, K.Li: "Hazards due to total body irradiation by Radar". Proc. of IRE, Nov. 1956, pages 1572–1581). Thus, at 3 GHZ and a skin thickness $d_H$ of 2 mm the emissivity E may vary between 60% and 30%, depending on the thickness of the fat layer $d_F$. The parameters skin thickness $d_H$ and the thickness of the fat layer thickness $d_F$ in the case of a non-invasive measurement are, generally, unknown.

Figure 2:
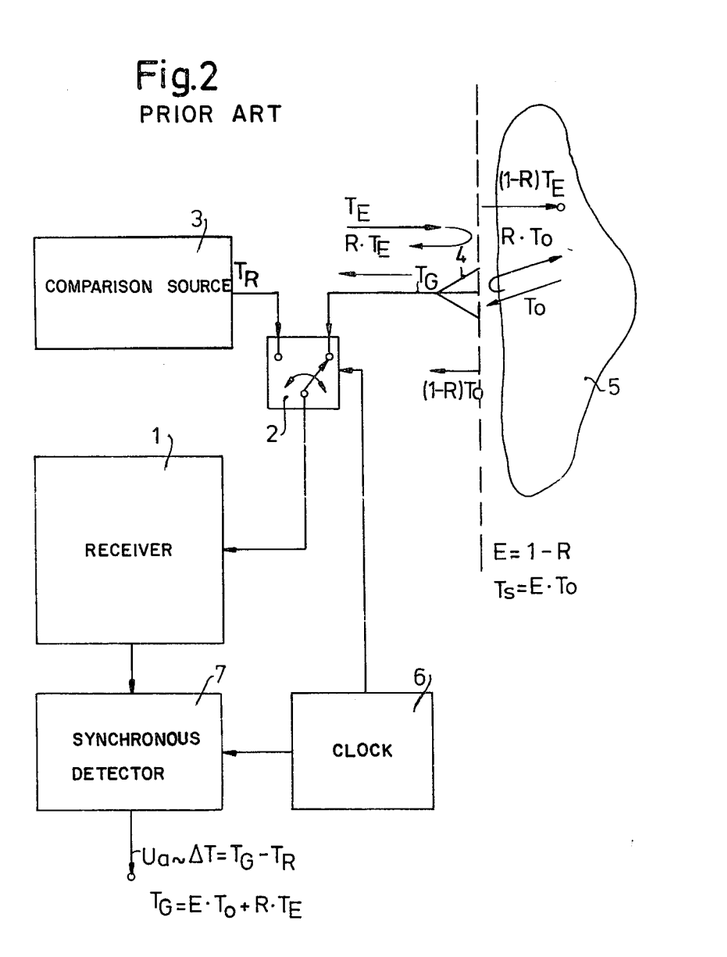

The prior art Dicke radiometer as shown in FIG. 2 consists of a highly sensitive microwave receiver 1, whose input is periodically switched (by means of a switch 2) from a receiving antenna 4, having the radiation temperature $T_G$ and being directed to an object 5, having a temperature $T_O$ to a comparison source 3, having the temperature $T_R$. A synchronous detector 7, which, like the switch 2, is controlled by a clock pulse generator 6 then supplies a d.c. voltage which is in proportion to the difference between the two temperatures:

$$T = T_G - T_R \tag{2}$$

Figure 3:
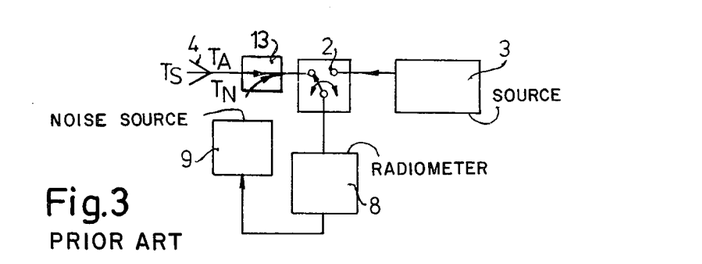
Figure 4:
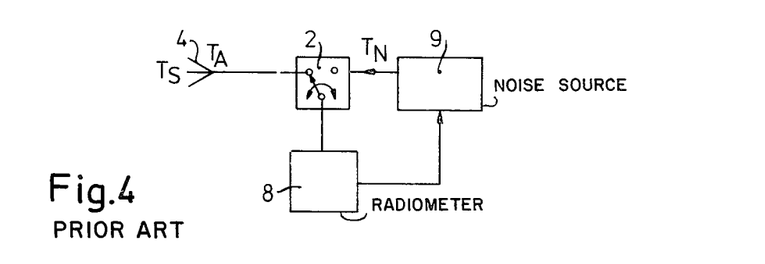

The known derived zero method (for example "Microwave Radiometry", Manual of Remote Sensing, American Society of Photogrammetry, Falls Church, Va., 1975, Part I, Chapter 9, pages 499–527) as shown in the FIGS. 3 and 4 either provides for addition at the output, or by means of a directional coupler 13 directed towards the radiometer, an electronic noise defined by the temperature $T_N$ (FIG. 3), or use a controllable noise source $T_N$ (FIG. 4) as the comparison source. In both cases an integral controller adjusts the calibrated variable noise source so that $\Delta T = 0$.

In the arrangement shown in FIG. 3, a Dicke radiometer 8 is alternately connected by means of the switch 2 to the antenna 4, which is directed at an object (not shown) and to the temperature comparison source 3. The output of the radiometer 8 is connected to the input of a controllable noise source 9, whose noise $T_N$ is coupled-in via a directional coupler 13. In the arrangement shown in FIG. 4 the comparison source is replaced by a controllable noise source 9.

These radiometer systems and all other prior art radiometer systems have in common that even when it is assumed that ideal modules are used, the measuring value obtained from the temperature measurements of, in the most simple case, an object which fully utilizes the antenna characteristic and has a constant temperature, has an absolute error F(T) (difference between the measuring value and the object temperature $T_O$), which is given by the equation:

$$F(T) = R \cdot (T_E - T_O) \tag{3}$$

In this equation R is the power reflection factor at the antenna and $T_E$ is a measure of the thermal radiation which extends in the radiometer 8 towards the antenna 4.

Here there is the correlation $$E + R = 1 \tag{4}$$

between the emissivity E of the object and the reflection factor R.

The power reflection R is the quantity which is commonly used in the microwave technique. It defines the missmatch of the antenna to the object.

In the example mentioned in the preamble, R can vary between 40% and 70% depending on the patient. When $T_R = 25°$ C. $T_O = 37°$C., a temperature difference of 12° C. This means a measuring error of between 4.8° C. and 8.4° C., which exceeds the desired accuracy of 0.1° C. in the order of many magnitudes.

The present invention has for its object to provide a method and an arrangement of the type defined in the preamble in which said error is obviated.

As equation (3) shows, the systematic measuring error F(T) can be obviated, independent of reflection factor R, by adjusting $T_E - T_O$ to be equal to 0, that is to say when in the general sense radiometer and object are isothermal, or, more accurately, when the radiation flux from the object to the antenna and from the radiometer to the antenna are equal.

Consequently, a first solution according to the invention of this object consists in that a noise signal is applied to an antenna which is constantly directed towards the object, and simultaneously is periodically and alternately applied to the radiometer together with the antenna signal (reflected noise + object emission). The integrated output signal of the radiometer controls the noise power and is in proportion to the object temperature.

Both noise component signals can vary independent of one another.

A second solution according to the invention consists in that a noise signal is continuously applied to an antenna which is directed towards the object and to a comparison reflector (open line, short circuit or purely reactive termination) and the partial signals periodically and alternately arrive at the radiometer whose integrated output signal controls the noise power and is in the proportion to the object temperature.

These automatic zero methods produce radiation equilibrium without changing the physical temperature of the radiometer itself, as the required noise temperature $T'_E$ of the radiation currents flowing into the direction of the antenna and a comparison noise temperature (also $T'_E$) are correspondingly adjusted by the introduction of additional types of electronic noise in order to simulate the required increased radiometer temperature $T'_E = T_O$.

Embodiments of the invention will now be further explained with reference to the drawings. In these drawings.

Figure 5:
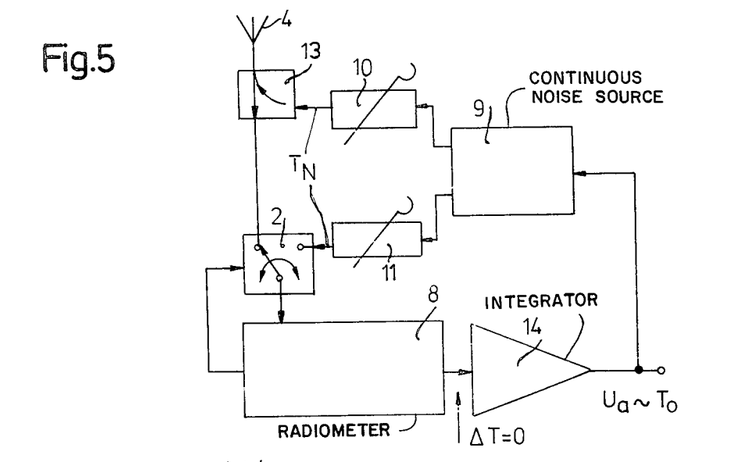
FIG. 5 shows an arrangement for performing the first method.

In a first arrangement shown in FIG. 5 the output signal of a controllable noise source 9 arrives via an adjustable attenuator 10 and a directional coupler 13 at an antenna 4 which is directed to an object (not shown) whose temperature must be measured. The signal from the noise source is simultaneously direct to a second adjustable attenuator 11 at a contact of a switch 2. The other contact of the switch receives the power reflected by the object together with the power emitted by the object itself. Switch 2 is periodically switched over in known manner by a clock pulse generator in the radiometer 8. Via an integrator 14, the output signal of the radiometer 8 is applied to an output terminal whose voltage $U_a$ corresponds to the temperature of the object and which is also used to control the noise source 9.

Figure 6:
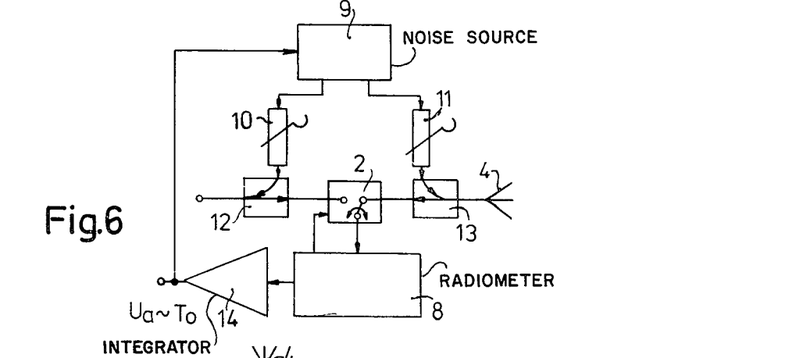
FIG. 6 shows an arrangement for performing the second method.

A second arrangement, shown in FIG. 6, also comprises the controllable noise source 9, whose output signal is also applied through two adjustable attenuators 10 and 11 to a directional coupler 12 and 13, respectively the directional coupler 12 being connected to a comparison reflector whereas the other coupler, 13, is connected to the antenna 4. The signals reflected by the comparison reflector and the object, as well as the signal emitted by the object are applied to the charge-over switch 2, which, controlled periodically, applies these partial signals alternately to the radiometer 8, whose output signal also controls the noise source 9 via an integrator 14. The output signal of the integrator 14 corresponding to the temperature of the object.

The measuring range of the arrangements extends from the minimum receiver input temperature $T_E$ (which is equal to the physical temperature of the attenuators 10, 11 and couplers 12, 13) to the maximum noise temperature $T'_E$ which is adjustable by means of the additional noise signals from the noise source 9. Semiconductor diodes having noise temperatures in the order of magnitude of $10^6$ K are available as the source. The required measuring ranges are adjusted by means of the attenuator 11; for example, 50 db attenuation $\triangleq$ $10^{-5}$ for a measuring range of 10° 30 dB attenuation $\triangleq$ $10^{-3}$ for a measuring range of 1000°.

The attenuator 10 is adjusted so that in the case of a total reflection at the antenna 4 the bridge arrangement consisting of the attenuators 10, 11, the couplers 12, 13, the switch 2 as well as the antenna and the comparison reflector is balanced with respect to the additional noise signals from the noise source 9.

Figure 7:
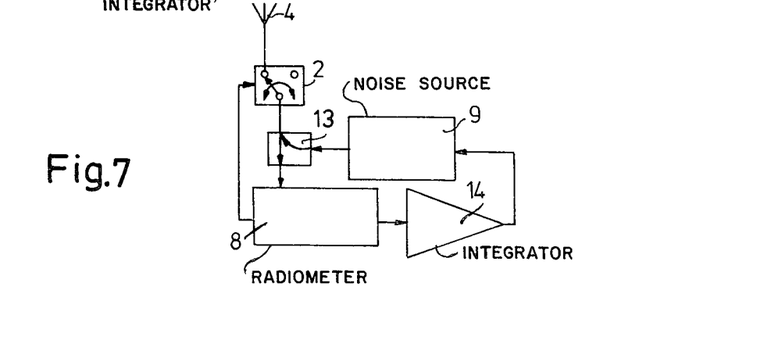
FIG. 7 shows a further arrangement.

A variation as shown in FIG. 7 which basically comprises the same models as the arrangements shown in FIGS. 5 and 6 is based on the assumption that ideal modules are used.

Figure 8:
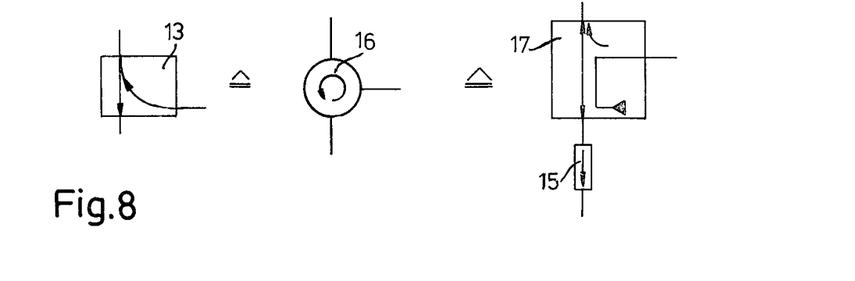
FIG. 8 shows various types of suitable couplers.

In these three arrangements the best results are then obtained when either a circulator 16 or a combination of line couplers 17 and an isolator 15, as shown in FIG. 8, are used as the directional coupler 13.

The most important error sources (in this sense second-order errors) then still remaining consist of:
(1) transmission losses between the antenna and the radiometer:
   (a) antenna losses
   (b) losses in the connecting cable between the antenna and the switch
   (c) losses in the switch,
(2) multiple reflections between the antenna and the switch,
(3) overlapping, at the side of the radiometer, of reflections of noise energy in the "On"-position and the reflections at the antenna (this only holds for the arrangement shown in FIG. 7),
(4) assymetrical switch operation, alternately as transmission and reflection member having a transmission $\tau < 1$ and reflection $R_S < 1$ (this only holds for the arrangement shown in FIG. 7,
   $\tau$ = transmission coefficient of the switch in the "On"-position,
   $R_S$ = reflection coefficient of the switch in the "Off"-position),
(5) self-emission of the passive modules (circulator, coupler, attenuator, connecting lines). This error does not occur, when all modules have the same physical temperature,
(6) self-emission of a PIN-diode switch used as, for example, switch 2
   (a) because of the diode temperature which is increased by the indispensible control current. This error does not occur when the switch inputs are symmetrically loaded, as in the arrangements shown in FIGS. 5 and 6, but do occur when the switch is operated asymmetrically, as in FIG. 7, in which the self-emission of the switch in the radiometer depends on the reflection R at the antenna,
   (b) apparent self-emission because of the microwave spectral portions of the diode control current. This emission is eliminated by alternately and separately driving the two PIN-diodes with a control current of the same polarity.

Error 4 is here described quantivately:
The relative measuring error amounts to $$\frac{\Delta T_O - \Delta T_N}{\Delta T_O} = \frac{\gamma}{1 + \gamma}, \text{ where} \quad (5)$$

$$\gamma = \frac{R}{1 - R}\left(1 - \frac{\tau^2}{R_S}\right)$$

This error only disappears (for all values of R) in the special case $\tau^2 = R_S$. In general however $$\tau^2 < R_S.$$

A practical example: From a typical switch transmission in the "On" position:

$$\tau \approx 0.9 \text{ and}$$

a typical switch reflection in the "Off" position:

$R_S \approx 0.9$,
R being 0.5, it follows that $$\frac{\Delta T_o - \Delta T_N}{\Delta T_o} = 9\%$$

or $F(T) = \Delta T_O - \Delta T_N = 1.1°$ C. at $\Delta T_O = 12°$ C.

Figure 9:
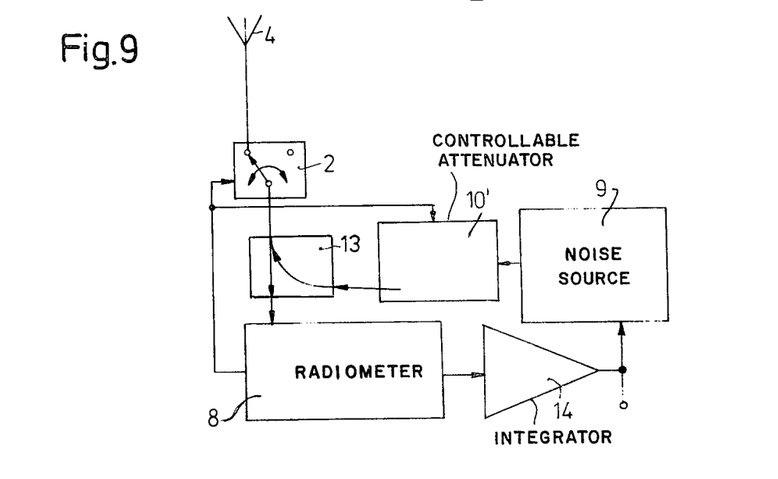
FIG. 9 shows a fourth arrangement.

If a longer cable is used between the antenna and the switch the corresponding total transmission $\tau$ becomes still smaller because of the losses in the connecting line but the error becomes still greater. This error can be eliminated by including an attenuator 10' which is switchable in synchronism with the switch 2 and which compensates because of a low attenuation is in the "On" state for the transmission losses of the electronic noise to as far as the antenna between directional coupler 13 (FIG. 9) and controllable noise source 9. In this manner the required radiation equilibrium at the antenna-object interface is possible with this arrangement rendered when modules are used which are not ideal. However, the remaining above-mentioned error sources remain. The arrangement shown in the FIGS. 5 and 6 have a fundamentally higher measuring accuracy because 1. the transmission losses between the antenna 4 and radiometer 8 are compensated for in a simple manner by a corresponding adjustment of the variable attenuator 10 which is connected to the coupler 13.
2. multiple reflections between the antenna 4 and switch 2 do not occur because of the non-reciprocal property of the coupler 13 arranged between them (circulator or line coupler plus isolator).

Figure 12:
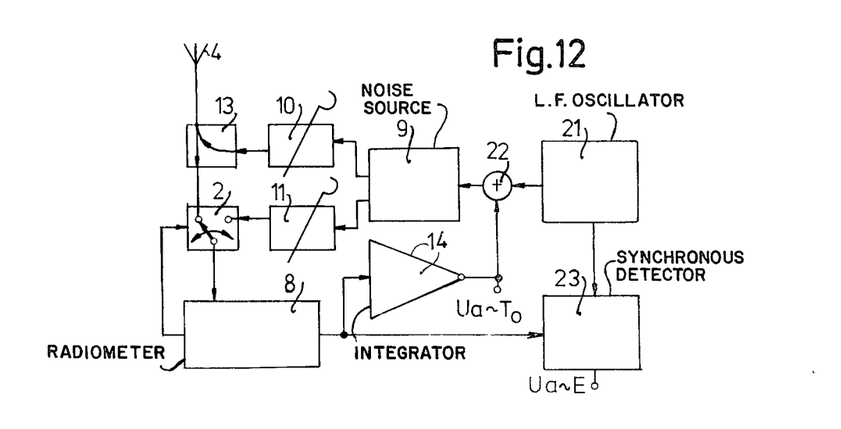

FIG. 12 is an alternate embodiment of the invention wherein the noise signal is amplitude modulated; the modulated signal at the output of the radiometer is continuously monitored. A low frequency oscillator 21 controls a synchronous detector 23 at the output of radiometer 8. The output of the oscillator is summed with the output of the integrator 14 to control and modulate the noise source 9.

The errors sources (3), (4) and (6a) described above are fundamentally impossible for this arrangement. The noise sources 5 and 6b can be kept sufficiently small as described above. The arrangements shown in the FIGS. 5 and 6 illustrate zero methods. In a more general sense they might be denoted as "isothermal radiometers" in contrast to conventional, non-isothermal radiometer methods, which neither use nor utilize the radiation equilibrium at the antenna.

Figure 10:
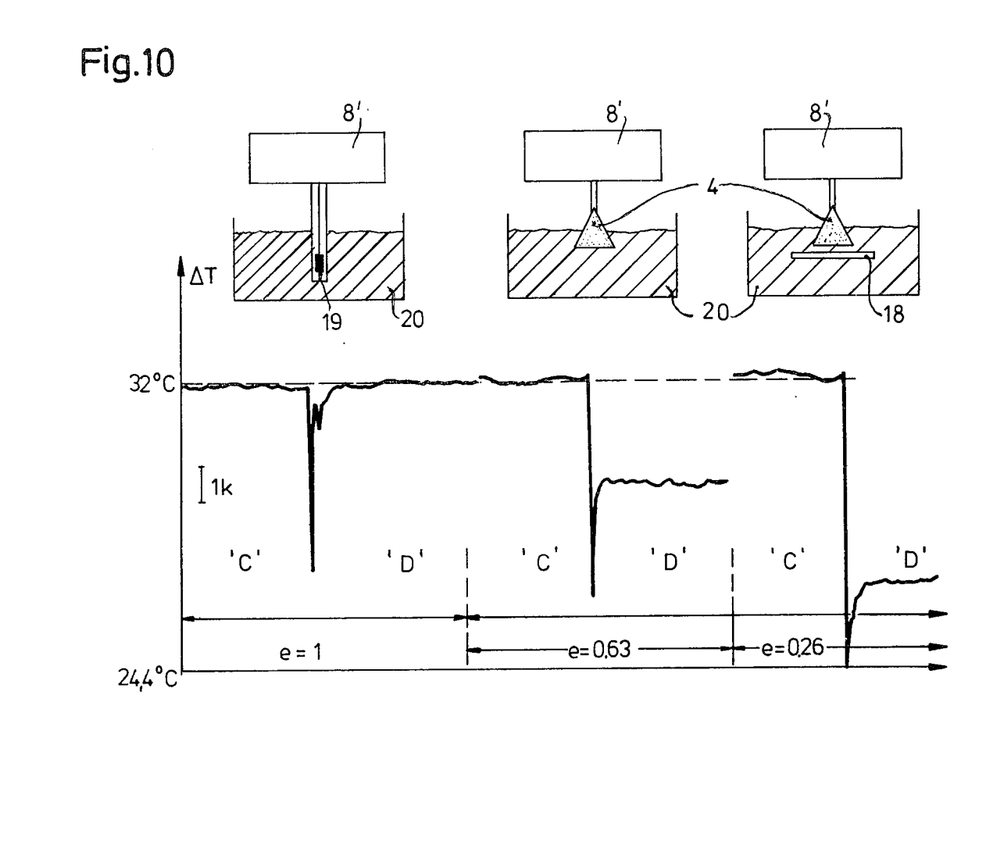
FIG. 10 shows a diagram which represents the improved measuring accuracy obtained by means of an arrangement shown in FIG. 5.

Practical results: FIG. 10 shows the improvement obtained in the measuring accuracy by an implementation as shown in FIG. 5 compared to a radiometer of the non-isothermal type.

In both cases the same device 8' is concerned, but it can be switched over from the operating mode as a compensating "isothermal" zero method "C" to the use as a conventional Dicke radiometer "D".

Here the object 20 to be measured consists of a physiological salt solution ($H_2O + 0.9\%$ NaCl) having a temperature of 32° C. at an ambient temperature of 24.4° C. So the excess temperature is 7.6° C. For calibration purposes a matched load resistor 19 which is located at the same temperature in water bath 20 is used instead of the antenna 4. In this manner an emissivity of $E = 1$, so $R = 0$, is simulated. In this case the two measuring methods show the same measuring value. A H-band microwave coupling flange filled with aluminium oxide is immersed in the bath and is used as an antenna in the 2–2.5 GHz frequency band. In this assembly the measuring object has an emissivity of approximately 0.63 (corresponding to a power reflection coefficient of $R = 0.37$). This value can be further reduced by providing a missmatching reflector 18 having a lower emissivity between the antenna aperture and the water bath (isothermal missmatched triple layer structure). In this case the emissivity is not more than $E = 0.26$ ($R = 0.74$).

The measuring curve shows the corresponding error of the Dicke radiometer (37% and 74%, respectively) whereas the compensating "isothermal" radiometer shows within the statistic fluctuations (in this example 3% or 0.3 K) the correct temperature value in all three cases.

Mathematical Appendix: To explain the basic notion of the invention the radiometer 8' (FIG. 11) is represented by a nominal load resistor having the temperature $T_E$ which is connected to the object. Antenna, object and ambient surrounding are determined by means of a one-gate (two-terminal circuit) which, for simplicity, is designated as the object in the following description. This object may have any internal structures and may comprise any number of independent internal sources, each having a temperature $T_1 \ldots T_i$.

Figure 11:
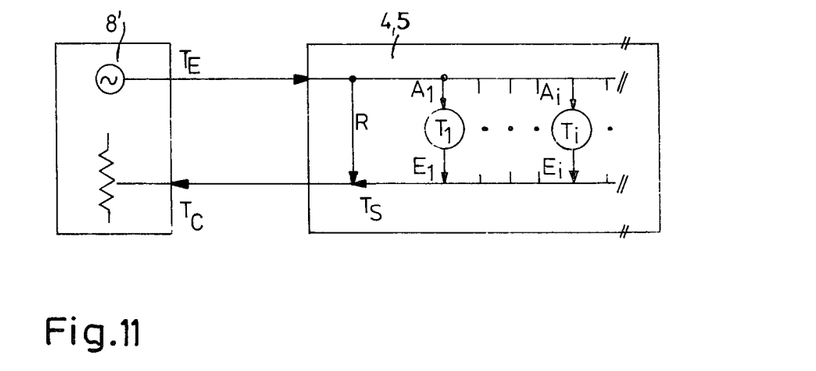
FIG. 11 shows an equivalent circuit diagram and FIG. 12 shows a fifth arrangement.

The two one-gates exchange radiation output values corresponding to the Nyquist formula: $P = K \cdot T \cdot B$ (K:Boltzmann-constant, B:width of the considered frequency and, T:temperature).

The principle of energy conservation requires that the sum of the power reflection at the input $R \cdot T_E$ and the internal power absorption $A_i \cdot T_E$ corresponds to 100% of the radiation (represented by $T_E$) incident on the object:

$$1 = R + \int A_i \quad (6)$$

The coefficients are average values of the measuring bandwith B. In a simplified manner $\int$ symbolizes the addition or integration necessary for the obtention of all volume elements of a different temperature or emissivity (distinguished by the index i). An average temperature $T_S$ of the object can be determined by a linear superposition of the individual inner sources:

$$T_S = \int E_i \cdot T_i \quad (7)$$

For the exceptional case of an object having a uniform temperature $T_O$ the equation is simplified to:

$$T_S = E_G \cdot T_O, E_G = \int E_i \quad (8).$$

Assuming, which is in practice always justified, that all individual components of the object satisfy the reciprocity law it holds that: $E_i = A_i$ and consequently:

$$1 \geq 1 - R = E_G \text{ or } E_G + R = 1 \qquad (9)$$

Therefore, the total emissivity $E_G$ is generally smaller than "Unity" for the value of the power reflection coefficient R. The input temperature $T_G$ "seen" by the radiometer results in:

$$T_G = T_S + R \cdot T_E \qquad (10)$$

In the Dicke-radiometer method and conventional methods derived therefrom, the radiometer or comparison temperature $T_E = T_R$ is constant and approaches the input temperature $T_G$.

In the special case of an object having a uniform temperature it follows for the systematic measuring error of the Dicke radiometer from the above equations that:

$$T_G - T_O = R \cdot (T_E - T_O) \qquad (11)$$

In the case the temperature distribution in the object is not uniform, $T_O$ can be replaced by the "available" temperature $T_{av}$:

$$T_{av} = \frac{\sum E_i \cdot T_i}{\sum E_i} = \frac{\sum E_i \cdot T_i}{1 - R} \qquad (12)$$

What is claimed is
1. A method for measuring the physical temperature of an object with a microwave Dicke radiometer, comprising the steps of:
   directing an antenna toward the object;
   constantly applying a microwave noise signal to the antenna;
   controlling the power of the noise signal with an integrated output signal from the radiometer; and
   periodically repeating the step of alternately connecting an input of the radiometer to (A) the continuous noise signal and (B) a signal from the antenna which includes both reflected noise and emission from the object;
   whereby the integrated output signal from the radiometer is proportional to the temperature of the object.
2. A method for measuring the physical temperature of an object with a microwave Dicke radiometer, comprising the steps of:
   directing an antenna toward the object;
   constantly applying a microwave noise signal to the antenna;
   simultaneously applying the noise signal to a comparison reflector;
   controlling the power of the noise signal with an integrated output signal from the radiometer; and
   periodically repeating the step of alternately connecting an input of the radiometer to (A) a noise signal reflected from the comparison reflector and (B) a signal from the antenna which includes both reflected noise and emission from the object;
   whereby the integrated output signal of the radiometer is proportional to the temperature of the object.
3. The method of claim 2 wherein the comparison reflector comprises an open-ended line.
4. The method of claim 2 wherein the comparison reflector comprises a short circuit.
5. The method of claim 2 wherein the comparison reflector comprises a purely reactive termination.
6. A method for measuring the physical temperature of objects by means of a microwave Dicke radiometer, comprising the steps of:
   directing an antenna toward the object;
   controlling the power of noise source with the integrated output signal of the radiometer;
   modulating the output of the noise source; and
   alternately connecting an output of the radio meter and the modulated noise source to (A) the antenna, whereby the radiometer receives the sum of the reflected noise and emission from the object and (B) a comparison reflector which reflects the modulated signal to the radiometer, the modulation being applied in synchronism with the alternate connecting step so that the noise signal is attenuated during state (B),
   whereby the integrated output signal of the radiometer is proportional to the temperature of the object.
7. A method as claimed in any of claims 1–6 further comprising the step of:
   further amplitude modulating the noise signal; and
   determining the emissivity of the object by detecting the output of the radiometer in synchronism with the further amplitude modulation.
8. Apparatus for determining the physical temperature of an object with microwaves comprising:
   a controlled noise source, having a first output and a second output;
   a first variable attenuator;
   a second variable attenuator;
   a first directional coupler;
   a second directional coupler;
   an antenna which is directed toward the object;
   a change-over switch having two inputs and an output;
   a radiometer; and
   an integrator;
   the first output of the noise source being connected, via the first variable attenuator and the first directional coupler, to supply noise signals to the antenna;
   the first directional coupler being further connected to supply signals from the antenna to a first input of the change-over switch;
   the second output of the noise source being connected via the second variable attenuator and the second directional coupler to supply power to the comparison reflector;
   the second directional coupler being further connected to supply power from the comparison reflector to a second input of the change-over switch;
   the output of the changeover switch being connected to an input of the radiometer, the change-over switch being controlled by the radiometer to alternately apply signals from each of its inputs to the input of the radiometer;
   the output of the radiometer being connected to the input of the integrator;
   the output of the integrator being connected to control the power of the noise source, whereby the output signal of the integrator is proportional to the temperature of the object.

9. Apparatus for measuring the temperature of an object with microwaves comprising:
- a controlled noise source, having a first output and a second output;
- a first variable attenuator;
- a second variable attenuator;
- a directional coupler;
- an antenna which is directed toward the object;
- a change-over switch having two inputs and an output;
- a radiometer; and
- an integrator;
- the first output of the noise source being connected to supply noise energy to the antenna via the first variable attenuator and the directional coupler;
- the antenna being further connected to supply signals, via the directional coupler, to a first input of the change-over switch;
- the second output of the noise source being connected, via the second variable attenuator, to a second input of the change-over switch;
- the change-over switch being connected to the radiometer to alternately supply, at an input of the radiometer, signals from its first input terminal and its second terminal;
- an output of the radiometer being connected to an input of the integrator; and
- an output of the integrator being connected to control the power of the noise source, whereby the output of the integrator is proportional to the temperature of the object.

10. Apparatus for measuring the temperature of an object using microwaves comprising:
- a controlled noise source;
- a controllable attenuator;
- a directional coupler;
- an antenna which is directed towards the object;
- a change-over switch having a first terminal, a second terminal, and a third terminal;
- a radiometer; and
- an integrator;
- an output of the noise source being connected via the attenuator and the directional coupler, to supply power to the third terminal of the change-over switch;
- the antenna being connected to the first terminal of the change-over switch;
- a comparison reflector being connected to the second terminal of the change-over switch;
- the third terminal of the change-over switch being further connected, via the directional coupler, to supply power to an input of the radiometer;
- the change-over switch being connected to and controlled by the radiometer to alternately interconnect (A) the first and third terminals and (B) the second and third terminals;
- the attenuator being controlled by the radiometer to attenuate noise signals when the change-over switch connects the second terminal to the third terminal;
- an output of the radiometer being connected to an input of the integrator;
- an output of the integrator being connected to control the power of the noise source, whereby the output of the integrator is proportional to the temperature of the object.

11. The apparatus of claim 8, 9 or 10 further comprising:
- a low frequency oscillator;
- an adder; and
- a synchronous detector;
- an output of the low frequency oscillator and the output of the integrator being connected, respectively, to inputs of the adder, the output of the adder being connected to control the power of the noise source, and the synchronous detector being connected to detect the output of the radiometer in synchronism with the output of the low frequency oscillator, whereby the output of the synchronous detector corresponds to the emissivity of the object.

12. The arrangement of claims 8, 9 or 10 wherein one or both directional couplers comprise circulators.

13. The apparatus of claim 11 wherein one or both directional couplers comprise circulators.

14. The apparatus of claims 8, 9 or 10 wherein one or both directional couplers comprise a line coupler and an isolator.

15. The apparatus of claim 11 wherein one or both directional couplers comprise a line coupler and an isolator.

* * * * *